Sept. 19, 1933.    E. F. ZAPARKA    1,927,537
AIRCRAFT CONTROL
Filed Oct. 3, 1929    3 Sheets-Sheet 1
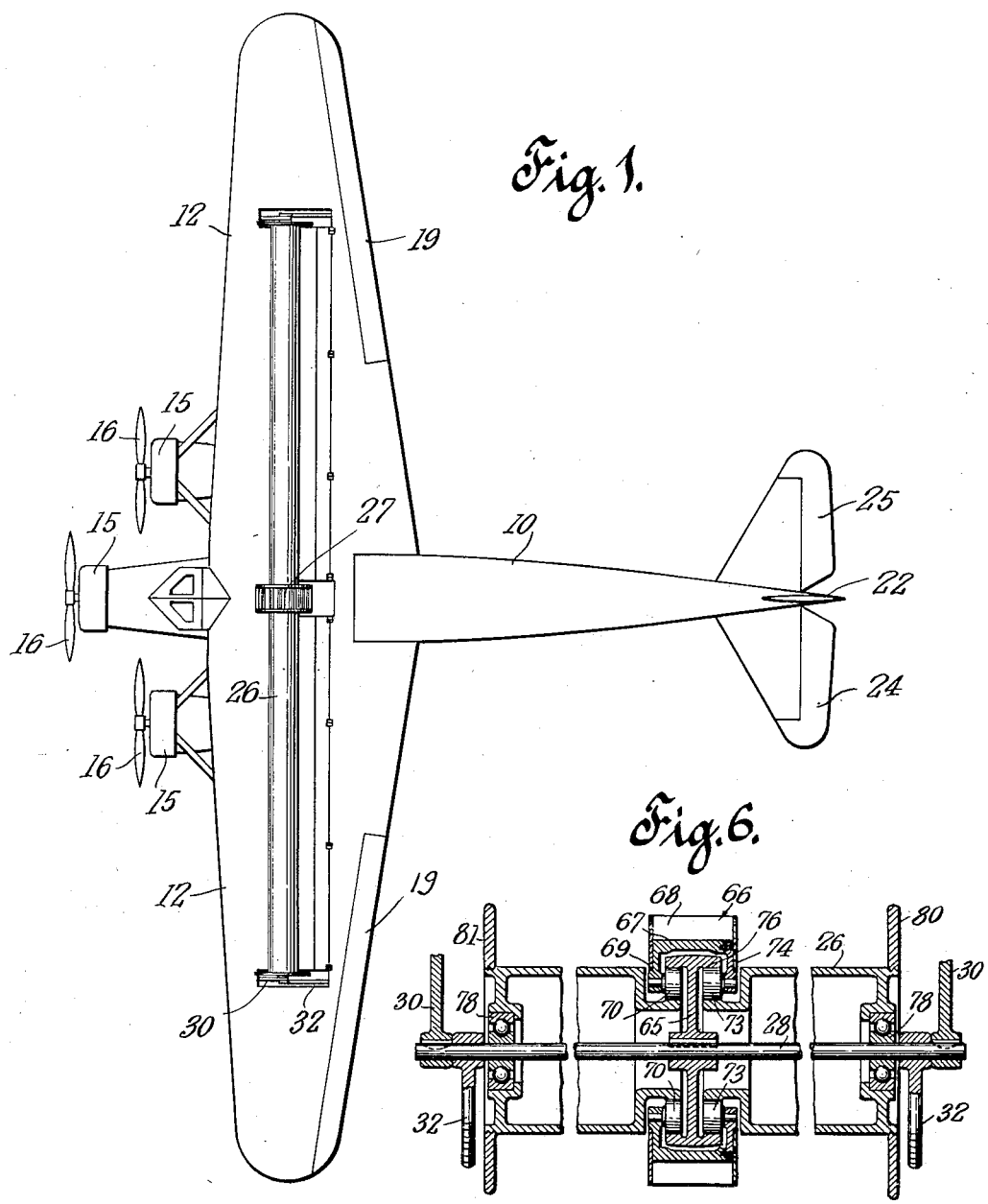
INVENTOR
Edward F. Zaparka
BY
Braselton, Whitcomb, Davies
ATTORNEYS.

Sept. 19, 1933.        E. F. ZAPARKA        1,927,537
AIRCRAFT CONTROL
Filed Oct. 3, 1929        3 Sheets-Sheet 2
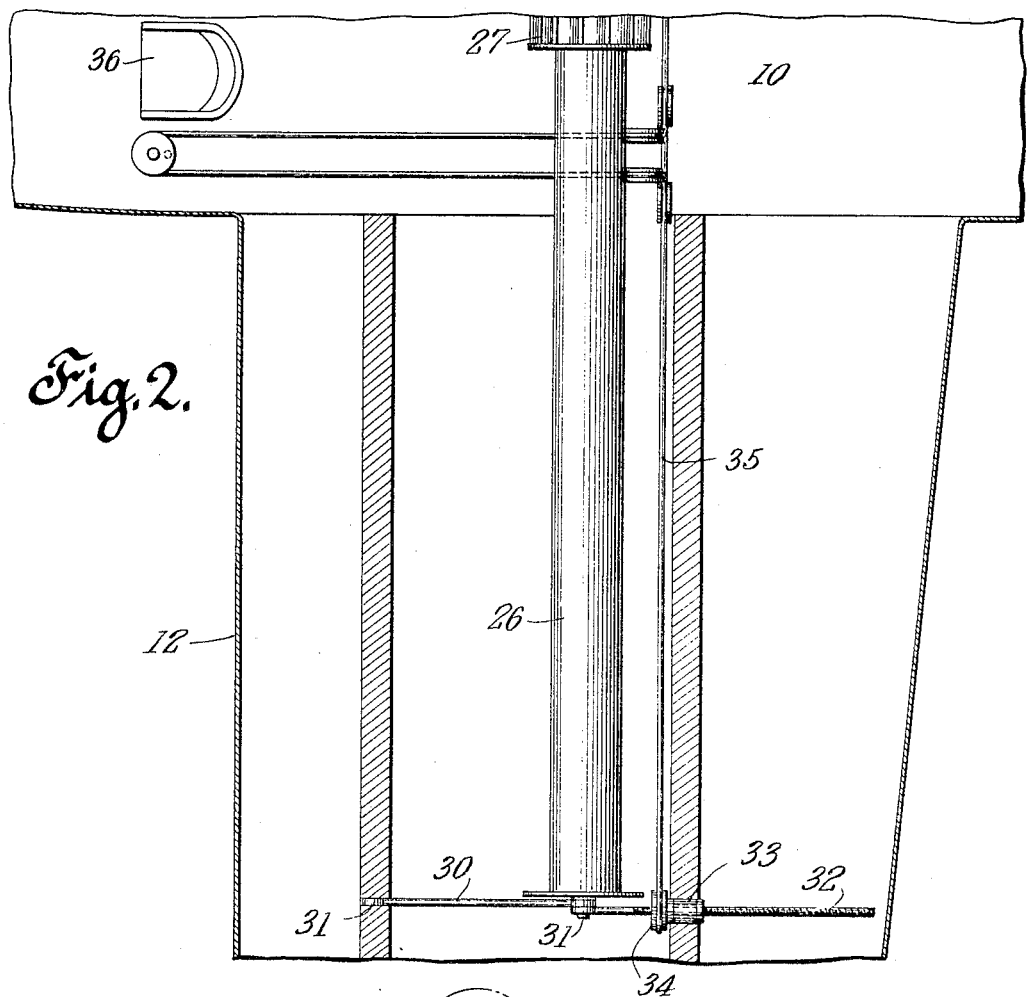
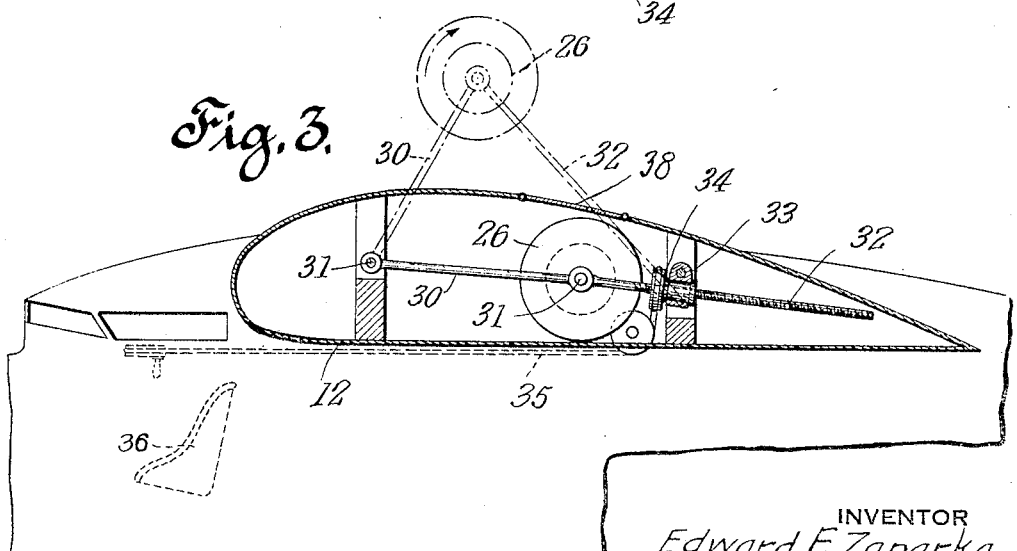

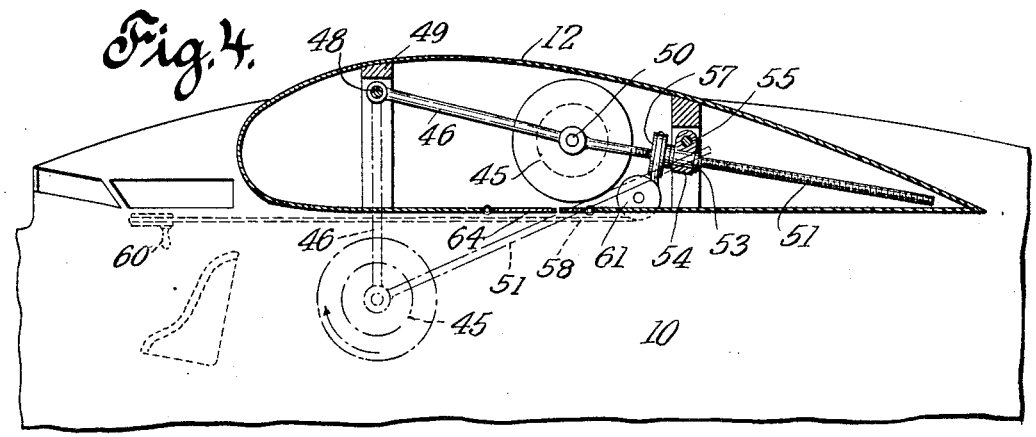
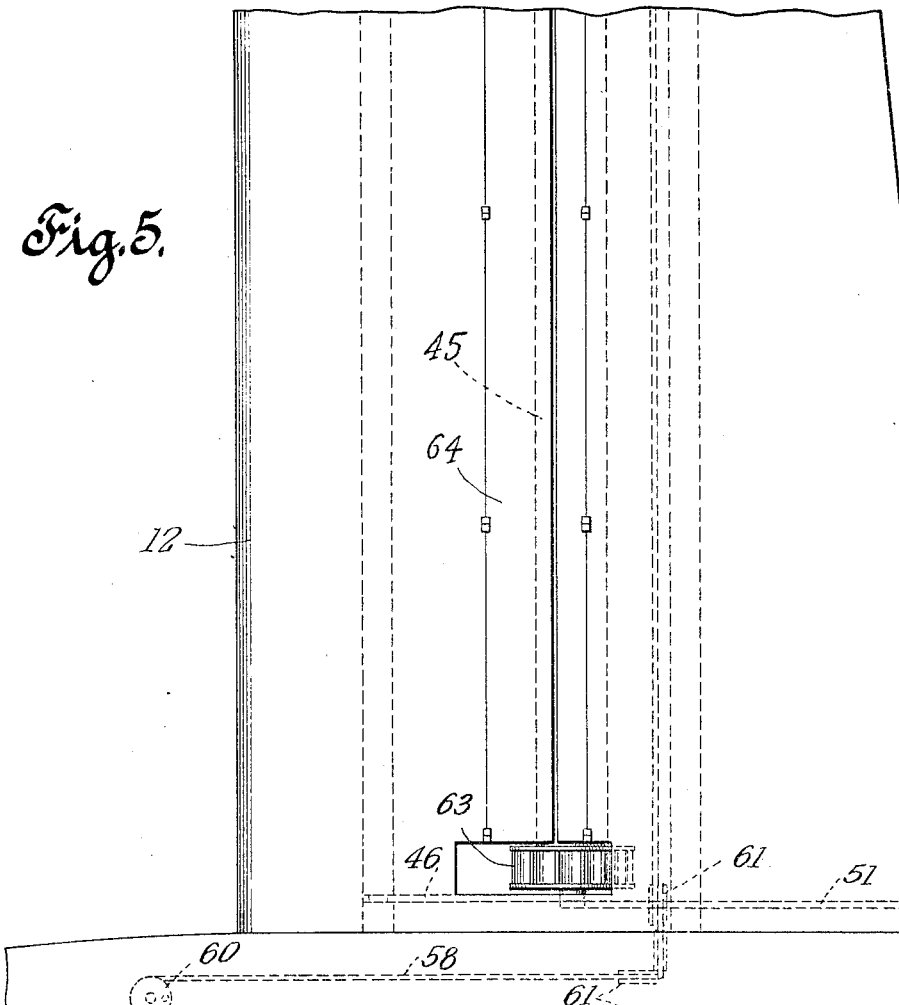

Patented Sept. 19, 1933

1,927,537

UNITED STATES PATENT OFFICE 1,927,537

AIRCRAFT CONTROL

Edward F. Zaparka, New York, N. Y., assignor to Zap Development Corporation, Wilmington, Del., a corporation of Delaware Application October 3, 1929. Serial No. 396,979

18 Claims. (Cl. 244—14)

This invention relates to the utilization in a variable manner of the energy of a flowing medium as a lifting force so as to change the effectiveness thereof and has for an object to provide an improved lifting arrangement for an aircraft whereby the lifting effect resulting from the movement of surfaces may be varied by changing the position of said surfaces with respect to the flowing medium.

The invention contemplates in an aircraft the utilization of rotating surfaces, a prime propelling means and means for variably controlling the ascent, translation or descent of said aircraft by adjusting the rotating surfaces with respect to said propelling means.

A further object of the invention is to provide a novel arrangement and assembly for the co-operating lifting elements with respect to the prime mover whereby said element can be readily moved to a position out of use.

The present invention also contemplates means to provide a moving air stream by revolving a stream of air itself adjacent a body, revolving or moving a skin surface of a body, revolving a cylinder or other shaped body to produce the effects referred to, or producing said effects by the employment of such means as will be apparent to those skilled in the art, including those types of devices which have been considered as utilizing in effect a Magnus action all or some one type of the same in combination with a stationary airfoil producing a greatly enhanced resultant aerodynamic efficiency with means for varying the position of said movable element or elements whereby at first permitting their use to the fullest extent, thus affording a steep ascent for the aircraft. Thereafter by modifying or withdrawing the effectiveness of said movable means altogether, the available energy is used for increased speed if desired. On descent, likewise, a standard form of control may effect a more vertical or direct downward move insofar as the standard airfoil is concerned without causing my improved aircraft to go into "tail spin" or fall as the movable sustaining means are now moved into action and immediately utilized to the fullest extent.

A further object of the present invention is to provide a construction of the type indicated in which, upon adjustment of the auxiliary means into position, the same commencing to operate and being located in the air stream, automatically become effective to produce a strong lifting force, this result taking place merely upon movement thereof into proper position.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of certain forms of the invention, in which Figure 1 is a top plan view of an airplane incorporating the sustaining and lifting devices;

Figure 2 is a fragmentary detail view of a portion of a plane showing the supporting and controlling means for the lifting and sustaining devices;

Figure 3 is a side cross-sectional view showing the mechanism for adjusting the lifting and sustaining devices;

Figure 4 is a view similar to Figure 3 showing a modified arrangement of the device of my invention;

Figure 5 is a bottom plan view of the part shown in Figure 4.

Figure 6 is a sectional view showing one form of speed increasing means for the lifting device.

I have shown my invention as incorporated in an air vehicle, but it is to be understood that I contemplate the use of my invention in any vehicle or construction adapted to travel in any fluid medium, for example, flying boats and water craft.

Referring to Figures 1, 2 and 3 of the drawings, I have illustrated one form of my invention incorporated in this instance in a tri-motored airplane, the latter including a main fuselage or support 10 to which is secured a pair of transversely standard type of airfoil or wings 12, the plane carrying the three engines 15 adapted to drive suitable propellers 16. It is to be understood that a standard construction of ailerons or side stabilizers 19 also the rudder and flight direction control devices indicated at 22 and elevators indicated at 24 and 25 may be used.

Combined and proportionately associated with said airfoil 12 is a moving surface in the form illustrated of a cylinder 26, the same being preferably horizontally disposed transversely of the aircraft adapted to be rotated by a turbine 27 which is connected with a speed increasing driving connection to said cylinder 26 and rotate the same in a direction so that its upper periphery is moved in the same direction as the air stream. The sustaining element 26 is of considerable length compared with its diameter, and may preferably consist of a hollow cylindrical metal body of light weight. Silk, cloth, or any suitable fabric secured to and maintained in the desired shape by a suitable support or frame can be used.

Those skilled in the art will understand that a rotating cylinder or other suitable shaped body of this character in a moving stream of air produces a lifting effect of a highly efficient order operating on what has been called the Magnus effect. It will be understood that in its normal full operating position the rotor 26 is properly positioned with respect to the airfoil 12 as to not decrease the normal lifting capacity of the same but increase its lifting power by modification of the air stream produced by the stationary airfoil. As illustrated more in detail in Figures 2 and 3, a basic feature of the present invention is means to modify the action of said auxiliary rotating cylinder 26 so as to vary the amount of lift produced thereby. Thus, in Figure 3, I have illustrated the sustaining element 26 carried by end links 30 pivoted at 31 to a suitable strut in the airfoil 12, the ends of the cylinder 26 being connected on pivots 31 to screw threaded rods 32 passing through pivoted internally threaded bearings 33 provided with a collar 34 adapted to receive band 35 for rotating the bearings 33, the band 35 as shown in Figure 3 extending up to and adjacent the aviator's seat 36. End discs or plates are used to confine the air current and prevent the spreading off action of the outer ends of the sustaining element. The dotted line position illustrated in Figure 3 shows a full extended location of the cylinder 26 whereas in full line, the same is shown in its ineffective position. To close the opening in the airfoil 12 through which the cylinder 26 extends, I provide hinged doors 38 adapted to be normally held closed by double acting springs.

In Figures 4 and 5 I have illustrated another form of the invention wherein the lifting device comprises a pair of cylinders 45 (one only of which is shown) suspended below the airfoil 12 by a pair of members 46, the members being pivotally supported as at 48 to a frame 49 forming the interior frame work of airfoil 12. As particularly shown in Figure 4, the device is capable of being adjusted to a position out of use wherein the cylinders 45 may be contained within the inner portion of the airfoil. To this end a threaded member 51 is pivotally connected to the shaft 50 supporting the roller and passes through a threaded bushing 53 journalled in a supporting member 54, the latter being pivoted as at 55 to a portion of the airfoil frame. Forming a part of the bushing 53 is a pulley 57 which is adapted to be operated by means of a flexible band 58. It will be apparent that rotation of the pulley 57 in the proper direction will cause the member 51 to be moved to the left until the cylinders 45 assume the position shown in dotted lines in Figure 4. The device may be adjusted from the pilot's position through the medium of a hand wheel 60 adapted to impart motion through the band 58 to the pulley 57, the band being suitably guided by means of guiding pulleys 61. Each cylindrical element 45 is provided at one end with a turbine rotor 63 adapted to impart rotative movement to the cylinders as will be hereinafter described. Suitable means are provided to close the opening in the airfoil 12 through which the cylinders extend. The means shown comprise hinged door 64 provided with suitable double acting springs for holding the same in their closed position.

I have found that the lifting effect of my device is proportional in a measure to the speed of rotation of the cylinder together with the velocity in the flow of the surrounding medium. To this end I have provided speed multiplying means for the rotor elements which are particularly illustrated in Figure 6. The device comprises a relatively stationary shaft 28 supporting at its central portion a fixed member 65 cooperating with the turbine wheel 66. Turbine wheel 66 comprises a circular member 67 carrying radially extending blades 68 and inwardly projecting flange 69 adapted to carry a series of rollers 70. A second set of rollers 73 is carried by a flange 74, the latter being removable to facilitate the assembly of parts and is fixed to the circular member 67. Both sets of rollers 70 and 73 engage suitable circular tracks 76 forming part of the fixed member 65. The innermost of the rollers engage and support opposing ends of the rotor elements 26 which are supported at their outermost ends by means of ball bearings 78 carried by the fixed shaft 28. The shaft 28 is fixedly secured to the arm 30 by a key or other suitable means. The threaded members 32 are pivotally secured to the extremities of the shaft 28. It will be apparent from the foregoing description that the speed of the rotating elements 26 will be considerably greater than the speed of the turbine wheel 66 through the medium of the rollers 70 and 73.

In order to increase the efficiency and prevent the air currents from spreading off the outer end of the sustaining element or cylinder, I have provided cylindrical discs or plates 80 and 81 suitably secured at the ends of said elements, the plates or discs being of greater diameter than the sustaining elements.

Operation

With the plane stationary, the sustaining element of my invention will be in its effective position as indicated in dotted lines in Figures 3 and 4. The sustaining element can obtain its rotative movement by the slip stream of the propeller acting on the air turbine which in turn through the speed multiplying means hereinbefore described will set up sufficient rotation of the lifting element whereby the maximum lifting effect is obtained. There will be seen that in addition to producing a lifting effect from the Magnus action or that inherently due to the movement of the sustaining element with respect to the air stream, a flow of air from the rotating element is produced adjacent to the airfoil which I have discovered greatly increases the lifting power of the same. As a result of the combined action and cooperation of the rotating element and the airfoil, I am able to increase the angle of attack before the stalling of "burble" point for the airfoil is reached, and the aircraft so constructed may climb at steeper angles, being more efficient, and costing less when compared with an airplane of the same carrying capacity of the usual construction.

When the pilot has reached the desired altitude and the sustaining element is no longer necessary, I may adjust the same in a position out of use as particularly shown in Figures 3 and 4 by suitable manipulation of the hand wheel controlling the adjusting means. The manipulation of the hand wheel through the suitable controlling mechanism hereinbefore described operated to move the cylinder with respect to the air stream to a position wherein no rotation of the same will be effected by the air stream.

When the cylinder is adjusted to a position out of use, the air resistance offered by the same to a linear travel of the plane is reduced, the power of the engine then being utilized entirely for translation of the plane through the air. In descending the cylinder is again adjusted to a position wherein it will be rotated by the air or slip stream, and the plane is thereby enabled to descend at an appreciably steeper angle without undue acceleration as the lifting effect of the sustaining element is present. The craft or airplane may be so angled by the tail controls so that practically no lifting effect of the airfoil is present and thereby enabling the plane to be brought to landing in a smaller space.

It can be seen that by the incorporation and proper association of the lifting devices hereinbefore described, an aircraft can be constructed whereby a steep climb can be obtained as a greater angle of attack can be affected before reaching the stalling or "burble" point of the airfoil, and a steeper descent can take place without undue acceleration to the lifting action of the sustaining element is present. In horizontal travelling, the plane can obtain its maximum speed as the lifting device can be readily adjusted within the airfoil as illustrated in the embodiment hereinbefore described.

It is to be understood that throughout a standard construction of airplane or aircraft is employed, unless modified as hereinabove indicated, as to the size, for example, of the airfoils and to receive the variations in such standard construction necessary to incorporate the added features in the form of the cylinders or auxiliary lifting mechansm.

It is apparent that, within the scope of the invention modifications and different arrangements may be made other than is herein disclosed and the same could be used in different environments, the present disclosure being illustrative merely, the invention comprehending all variations thereof.

What I claim is:

1. In an air vehicle, the combination of a support; an airfoil, a propelling means carried by said support; a movable surface for producing a lifting effect adjustably supported by said airfoil; air driven driving means for said surface and means for adjusting said surface with respect to said airfoil for varying the amount of lift.

2. In an aircraft, the combination of a support; a propelling means carried by said support; an airfoil carried by said support; a Magnus producing movable surface acting as a lifting force adjustably supported by said airfoil; air driven means for driving said surface and means for adjusting said surface with respect to said airfoil for varying the amount of lift for said aircraft and for rendering said surface ineffective.

3. In an aircraft, the combination of a support; an airfoil carried by said support; a Magnus producing lifting means comprising a surface adjustably supported by the airfoil; air driven means for driving said surface and means for adjustably moving said means to an ineffective position.

4. In an aircraft, the combination of an airfoil and a relatively movable cylindrical surface constituting a lifting means for said aircraft by the relative motion between said surface and said aircraft; and means to adjust said surface to an ineffective position; and means to impart motion to said cylindrical surface.

5. In an aircraft, the combination of an airfoil, a support carried by said airfoil; a lifting means for the aircraft including a movable cylindrical surface adjustably carried by said support; air driven means to impart rotation to said surface; and means to move said movable surface to an ineffective position.

6. In an aircraft, the combination of a support; means carried by said support to accelerate the adjacent air producing an air stream; a movable surface carried by said support adapted to produce when rotated a lifting effect; rotating means for said surface driven by said air stream; speed increasing means between said surface and the rotating means and means adapted to move said surface to an ineffective position.

7. In an aircraft, the combination of a support; means carried by said support to accelerate the adjacent air producing an air stream; a movably supported cylindrical surface carried by said support adapted to produce when rotated a lifting effect; and rotating means driven by said air stream; speed increasing means between the last mentioned means and said movable surface; and means adapted to move said surface to an ineffective position.

8. In an aircraft, the combination of a support; an engine carried by said support; a propeller driven from said engine and adapted to produce an air stream; a movably supported surface carried by said support; means for rotating said surface adapted to be located within the air stream produced by said propeller; and means for moving said surface and the rotating means with respect to said propeller.

9. In an aircraft, the combination with an airfoil, a movable surface for producing a lifting effect; means to move said surface upon movement of said aircraft; means to increase the speed of movement of said movable surface with respect to the velocity of the approaching air stream; and means to adjust said surface to an inactive position.

10. In an aircraft, the combination of an airfoil; a cylindrical surface adjustably supported by the airfoil and adapted for rotative movement; a propeller for the aircraft; a source of power for driving said propeller; means whereby said cylindrical surface is operated in conjunction with said aircraft propeller independently of said source of power; and means to adjust said surface to an ineffective position.

11. An aerial vehicle including a support; an airfoil carried by said support; means adapted to produce an air stream; a movably supported surface carried by said support adapted to be rotated; means for rotating said surface driven by the air stream, the surface being adjustably positioned with respect to said airfoil as to normally increase the lifting effect of the latter by permitting the resultant air flow from said movable surface to modify the stream line of flow from said airfoil; and means for moving said surface with respect to the airfoil for rendering the same ineffective.

12. In an aircraft, the combination of a support; means carried by said support to produce an air stream; lifting means including an airfoil and a cylindrical surface; a driving element driven by said air stream adapted to impart rotative movement to the cylindrical surface; and means to adjust said lifting means to an ineffective position within said airfoil.

13. In an aircraft, the combination of a support; means carried by said support to produce an air stream; lifting means comprising a surface; a driving element for moving said surface driven by the air stream; and means to move said surface and said driving element out of the air stream for rendering the lifting means ineffective.

14. In an aircraft, the combination of a support; means carried by said support to produce an air stream; lifting means comprising a cylindrical surface; a driving element adapted to impart rotative movement to the cylindrical surface driven by the air stream; and means to rotate the cylindrical and said driving element out of the air stream for rendering the lifting means ineffective.

15. A plurality of lifting units, one of said units having a movable surface and said units being so positioned with respect to each other as to avoid decreasing the normal lift of one of said units and permit air flow from said movable surface to modify air flow from said unit to increase the lifting action thereof; and means to move the surface of said movable surface unit; and means whereby said movable surface is rendered ineffective.

16. In an aircraft, the combination of a support; lifting means for the aircraft comprising an adjustably supported relatively movable surface carrying a turbine; fluid circulating means carried by said support to impart movement to said turbine; and means to adjust said surface with respect to the means adapted to impart movement to the turbine for rendering the lifting means ineffective.

17. In an aircraft, the combination of an airfoil; a rotatable cylindrical surface within said airfoil; means to move said cylindrical surface to an operative position; means to rotate said cylindrical surface to increase the effectiveness of said airfoil; and means to increase the speed of rotation of said cylindrical surface.

18. In an aircraft, a fuselage; a relatively stationary airfoil; a revoluble sustaining element; means for rotating said sustaining element, said element being normally disposed interiorally of the airfoil; and means for projecting the same outwardly from the airfoil to effective position.

EDWARD F. ZAPARKA.